United States Patent [19]

De Bruyne

[11] Patent Number: 4,758,691
[45] Date of Patent: Jul. 19, 1988

[54] APPARATUS FOR DETERMINING THE POSITION OF A MOVABLE OBJECT

[75] Inventor: Pieter De Bruyne, Zurich, Switzerland

[73] Assignee: Zellweger Uster Ltd., Uster, Switzerland

[21] Appl. No.: 6,145

[22] Filed: Jan. 23, 1987

[30] Foreign Application Priority Data

Jan. 23, 1986 [CH] Switzerland ............... 00265/86

[51] Int. Cl.⁴ .................. G08C 21/00; G09G 1/00
[52] U.S. Cl. ........................... 178/19; 367/907
[58] Field of Search ............... 178/18, 19; 367/124, 367/127, 129, 181, 907

[56] References Cited

U.S. PATENT DOCUMENTS

| 4,317,005 | 2/1982 | De Bruyne | 178/19 |
| 4,506,354 | 3/1985 | Hansen | 367/907 |
| 4,578,674 | 3/1986 | Baker et al. | 178/18 X |

OTHER PUBLICATIONS

"Zweiohrige Maus" (two-eared mouse) by P. Wendt in mc Die Mikrocomputer Zweschrift, No. 10/1984.
"An Ultrasonic Radar Graphic Input Table", by P. de Bruyne in Scientia Electrica, vol. 30, Fasc. 1 (1984), pp. 1-26.
IEEE Transactions on Computers, vol. C-19, No. 6, Jun. 1970, pp. 546-548, "A Sonic Pen: A Digital Stylus System" by A. E. Brenner and P. de Bruyne.
IEEE Computer Graphics and Applications, Dec. 1986, "Compact Large-Area Graphic Digitizer for Personal Computers" by P. de Bruyne, pp. 49-53.

Primary Examiner—Stafford D. Schreyer
Attorney, Agent, or Firm—Burns, Doane, Swecker & Mathis

[57] ABSTRACT

The apparatus contains two fixed ultrasound transmitters, an ultrasound receiver forming part of the movable object, and a calculator. A trigger signal from the calculator releases ultrasonic pulses on the ultrasound transmitters and the calculator determines the coordinates of the ultrasound receiver and hence of the movable object from the times required for the ultrasonic pulses to travel from the ultrasound transmitters to the ultrasound receiver and from the distance between the ultrasound transmitter. The apparatus is suitable in particular for controlling the cursor on a screen by means of a so-called "mouse" and enables precise determination of position and accurate and simple calculation of coordinates and may therefore be used as so-called "digitizer" for geometric data processing.

23 Claims, 5 Drawing Sheets

APPARATUS FOR DETERMINING THE POSITION OF A MOVABLE OBJECT

BACKGROUND OF THE INVENTION

Many peripheral working aids are already available on the computer market to help the user control the cursor on the screen. The most popular of these is the so-called "mouse" whose movement controls the movement of the cursor. Most of the mice hitherto available operated by optical or mechanical processes and the positions were determined by means of a special indicator board with special support for the mice or with wires stretched across the indicator board. Since this requires relatively elaborate mechanical work or the formation of special surfaces, which increase enormously in cost with the increasing requirements for accuracy and power of resolution, there has for some time now been a quest for different systems for determining position.

The present invention relates to an apparatus for determining the position of a movable object within a given boundary and relatively to fixed reference points by means of acoustic signals, preferably ultrasonic pulses, comprising transmitter and receptor means for the ultrasonic pulses and means for determining their travelling time between the movable object and the fixed reference points.

An apparatus of this kind is described in the article "Zweiohrige Maus" (two-eared mouse) by P. Wendt in "mc Die Mikrocomputer Zeitschrift", No. 10/1984. In this apparatus, the receiver means are microphones and to measure the travelling time, counters are started in response to a trigger signal when sound pulses are transmitted by the transmitter and stopped on reception of a signal by the microphones. Care must be taken to ensure that the outlet opening of the transmitter is directed towards the microphones because otherwise the travelling time may be determined by reflections. The position determination is not very accurate, partly for this reason and partly owing to the relatively large size of the microphones. This known apparatus therefore cannot be used as so-called digitizer, i.e., as peripheral instruments for feeding the coordinates of a drawing into a computer system for geometrical data processing.

It is an object of the present invention to provide an apparatus for position determination distinguished by very precise determination of the position and a high power of resolution.

SUMMARY OF THE INVENTION

The solution to this problem provided according to the invention is characterized in that the transmitter and receiver means are formed by cylindrical ultrasound transducers.

The use of cylindrical ultrasound transducers enables the coordinates of the mouse to be calculated very simply and accurately, and does not require the transmitter and receiver means to be aligned with each other. The precision of position determination and the power of resolution provided by the invention are greater by about one order of magnitude than in the cited "Two-Eared Mouse."

The apparatus according to the invention may be used both as wired and as wireless cursor, that is to say that the movable object may be connected to the control unit of the apparatus through a lead, which enables the travelling time to be determined by a relatively simple procedure, or it may have no physical connection to the control unit, so that the mobility of the object is not restricted by a lead.

According to a first, preferred further development of the apparatus of the invention, means are provided for the transmission of pulses in the region of visible or invisible light for the purpose of wireless indication of the point in time of the transmission or reception of the ultrasound pulses and means are provided for the detection of these light pulses.

This results in maximum freedom of mobility of the movable object and the wireless indication according to the invention of the point in time of transmission or reception of the ultrasound pulse by means of optical pulses and renders the measurement of travelling time substantially in sensitive to electrical disturbances.

According to a second, preferred further development of the apparatus according to the invention, the cylindrical ultrasound transducers are so-called Sell transducers the surface of which is covered with a plastic foil electret which is metallized on one side and forms the movable electrode of a condenser which has an air gap.

This arrangement enables extremely short pulses, so-called acoustic shock waves to be transmitted to the surrounding air, where the precision of calculation of the mouse coordinates is further improved.

BRIEF DESCRIPTION OF THE DRAWINGS

The invention will now be explained in more detail with reference to an exemplary embodiment illustrated in the drawings, in which.

DETAILED DESCRIPTION OF THE PREFERRED EMBODIMENT

Figure 1:
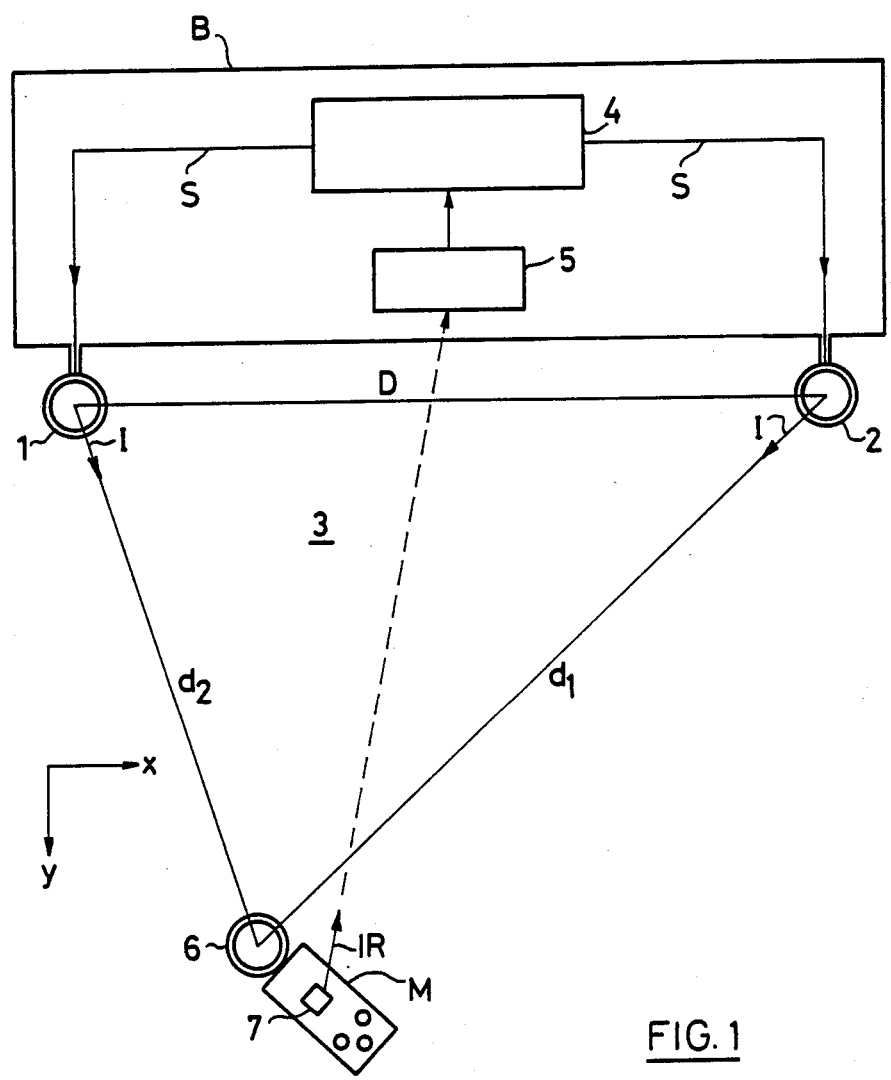
FIG. 1 is a diagrammatic sketch of the apparatus according to the invention shown in plan view.

FIG. 1 shows two ultrasound transmitters 1 and 2 for measuring the position of a movable object or mouse (M) which is manually displaceable within a surface area 3. The ultrasound transmitters 1 and 2 form parts of the base station (B) of the apparatus which in addition has a calculator 4 and an infrared receiver 5. The calculator 4 activates the ultrasound transmitters 1 and 2 to transmit ultrasonic pulses I and is connected to the infrared receiver 5.

The mouse M substantially comprises an ultrasound receiver 6 and an infrared transmitter 7. The ultrasound transmitters 1 and 2 are spaced apart by the distance D in one coordinate direction, the x-direction in the drawing.

The position of the mouse M in relation to the fixed coordinate system having x and y axes is determined by successively measuring the travelling times of the ultrasonic pulses 1 from the ultrasound transmitters 1 and 2 of the base station B to the ultrasound receiver 6 of the mouse M. A short, accurately defined ultrasonic pulse I is released by application of a starting pulse S to the ultrasound transmitter 1 or 2 and a counter begins counting simultaneously with the starting pulse.

The ultrasonic pulses I are received by the ultrasound receiver 6 of the mouse M, the time intervals between release and reception of each ultrasonic pulses I depending on the distances in space $d_1$ and $d_2$ of the ultrasound receiver 6 of the mouse M from the ultrasound transmitter 2 and 1, respectively, of the base station B. The ultrasonic pulses I received by receiver 6 are converted into electrical signals in the mouse M and the first maximum of the required signal is detected. By means of this detection, the infrared transmitter 7 of the mouse returns an infrared pulse sequence IR to the base station B. This pulse sequence IR is received by the infrared receiver 5 of the base station B and stops the counter.

The state of the counter is thus characteristic of the travelling time of the corresponding ultrasonic pulse over the distance $d_1$ or $d_2$ and hence, the velocity of sound being known, it is also characteristic of the distance $d_1$ or $d_2$ of the mouse M from the transmitter 2 or 1. From the values $d_1$ and $d_2$ and the known distance D between the two ultrasound transmitter 1 and 2, the calculator 4 is able to determine the x and y coordinates of the mouse M according to the following formulas.

$$x = \frac{2}{D}(p - d_1)(p - d_2)$$

$$y = \sqrt{d_2^2 - x^2}$$

where: $p = \frac{D + d_1 + d_2}{2}$ (Assuming that the zero point of coordinate system lies at the center of the ultrasound transmitter 1.)

Figure 2:
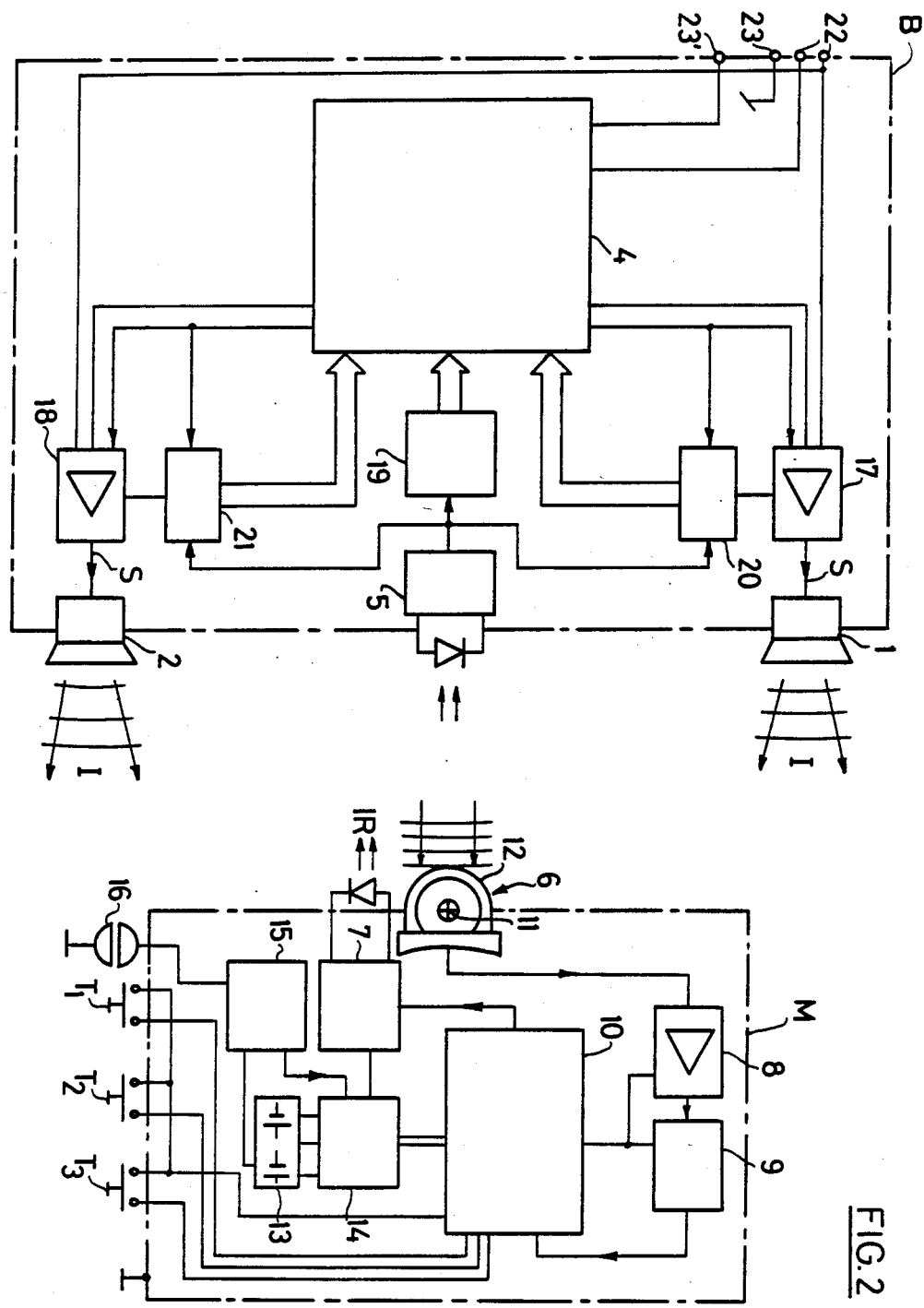
FIG. 2 is a block circuit diagram indicating the mode of operation of the apparatus according to the invention.

FIG. 2 is a block circuit diagram of the apparatus according to the invention with base station B and mouse M illustrating the function of the apparatus.

The mouse M consists, as illustrated, of three functional blocks, namely the ultrasound receiver or receiver transducer 6, a pre-amplifier 8 with maximum detector 9 and a digital logical part 10 with infrared transmitter 7.

The ultrasound receiver 6 has the form of a short, hollow cylinder containing in its bore a plexiglass disc with crosswires 11 so that the mouse M can be accurately positioned on a particular point. The crosswires 11 may be combined with a magnifying lens as a positioning aid. The ultrasound receiver 6 is externally completely grounded and protected against mechanical influences and very powerful electrical disturbances by a grounded metal grid 12.

In order that an ultrasound pulse received by the ultrasound receiver 6 may be optimally detected by means of its maximum or its first maximum, a preceding undershoot should reach its maximum as rapidly as possible and die down equally rapidly. The forms of sound pulse which fulfill this condition are those which can be approximated by a sine wave of a half or whole period. Both forms are permissible since the first maximum of the ultrasound pulse is detected.

In conformity with these permissible forms of sound pulse, the ultrasound transmitters 1 and 2 (FIG. 1) transmit sound pulses I which have approximately the form of a sine (180° segment) half wave or a (360° segment) sine wave. The ultrasound receiver 6 converts this acoustic signal into a corresponding electrical signal which also has the form of a sine half wave or sine wave. This electrical signal is selectively amplified by the preamplifier 8 and the first maximum of this amplified signal is detected by the maximum detector 9. On detection of the first maximum of the amplified electrical signal corresponding to the ultrasound pulse, the maximum detector 9 transmits a corresponding signal to the digital logical part 10, by which the transmission of an infrared pulse sequence is started by the infrared transmitter 7, the start bit of which sequence stops the counter of the base station. The data format of the infrared pulse sequence is so chosen that in addition to the start bit, the state of three operating keys $T_1$ and $T_3$ and the operating state of the mouse M are transmitted serially to the base station B. The pulse width of a pulse of the infrared pulse sequence is preferably 10 microseconds, the distance between two successive pulses is preferably 64 microseconds, and the key ratio of the infrared pulse sequence is therefore approximately 1:6.

The mouse M is supplied with current from a feed element 14 which in turn is supplied by batteries 13. The mouse M should be switched off as often as possible owing to the relatively high current consumption of the analog circuit part composed of the pre-amplifier 8 and the maximum detector 9. A special on/off switching logic 15 with contact sensor 16 is provided for this purpose.

When initially the mouse M is switched off, the first contact with the mouse causes the feed voltage for the electronic circuit to be switched on (feed element 14) and thereafter the infrared transmitter 7 transmits a sequence of infrared pulses to the base station B, indicating to the station B that the mouse M is in operation and that position determination should be carried out. If no further contact is then made with the mouse M within a certain time amounting to a few seconds, say four seconds, then a switching off bit is inserted into the infrared pulse sequence, whereby the mouse M is dismissed from the base station B and the feed element 14 is switched over to stand by.

The base station B consists, as illustrated, of the ultrasound transmitters or transmitter transducers 1 and 2, the calculator 4, the infrared receiver 5, two electric pulse transmitters 17 and 18, a digital logical part 19 and two counters 20 and 21. In addition, there are provided two connections 22 for the current supply, a connection 23 for grounding the base station B and a connection 23' for a calculator.

Each time a measurement is to be carried out, the electrical pulse transmitters 17, 18 receive a trigger signal S which starts the corresponding counter 20 or 21. The electrical pulse transmitter 17 or 18 produces a suitably shaped pulse which is transmitted to the associated ultrasound transmitter 1 or 2 and causes an ultrasound pulse I to be sent out. The base station B then receives an infrared signal from the infrared transmitter 7 in the mouse M, and this signal is converted into an electrical signal in the infrared receiver 5. This electrical signal reaches the corresponding counter 20 or 21 to stop this counter and in addition is transmitted to the digital logical circuit 19 which decodes the information of the infrared pulse sequence and reads it into a register from which it can be read out by the calculator 4.

As already mentioned, the processes described above take place successively for the two ultrasound transmitters 1 and 2, i.e., the time of travel of sound from the ultrasound transmitter 1 to the mouse M is first noted and thereafter the time of travel from the ultrasound transmitter 2 to the mouse M. Again, as already mentioned, the sound pulses transmitted by the ultrasound transmitters 1 and 2 have approximately the form of a sine wave of one half or one whole period. These sound pulses should, of course, be as inaudible as possible.

It has been found that this requirement is very satisfactorily fulfilled by a sound pulse having the form of a sine wave of exactly one whole period. The loudness of the "bang" released by the ultrasound transmitters 1, 2 can be reduced to such an extent by using a sound pulse form of this kind that it is masked by the normal sound level in an office and is hardly noticed.

This voltage pulse is produced by the electric pulse transmitter 17, 18 which thus has the function of producing an electrical signal of a suitable form for the ultrasound transmitter 1 or 2 after a trigger pulse has been received by the calculator 4. This electrical signal is a rectangular voltage pulse having an amplitude of about 200 V and a duration of about 1.5 microseconds. This amplitude is necessary to ensure that the sound pulse transmitted by the ultrasound transmitter 1, 2 will be sufficiently powerful, and the form of the sound pulse arises from the properties of the ultrasound transmitters 1, 2.

The ultrasound transmitters 1, 2 as well as the ultrasound receiver 6 of the mouse M basically consist each of a condenser with an air gap and one solid and one movable electrode. The movable electrode consists of a plastic foil which is metallized on one side and is stretched by its other side over the fixed metallic electrode. The conductive surface of the plastics foil and the solid electrode thus form a condenser. When a voltage is applied to the electrodes of this condenser, the plastics foil forming the movable electrode is stretched and thereby sends out an acoustic wave front. Conversely, the acoustic wave front received by the ultrasound receiver 6 of the mouse M produces a movement in the plastics foil which gives rise to a corresponding change in voltage between the electrodes of the condenser. The theory and properties of ultrasound transducers will not be further discussed here but reference may be made to U.S. Pat. No. 4,317,005 to de Bruyne and to the publication, "An Ultrasonic Radar Graphic Input Table" by P. de Bruyne in SCIENTIA ELECTRICA, Vol. 30, Fasc. 1 (1984), pages 1 to 26, and the literature references given in this publication, all of which are incorporated herein by reference.

For satisfactory resolution, the two ultrasound transmitters 1 and 2 should be placed at a certain distance D apart (FIG. 2). In one embodiment which has been tried out in practice, D=40 cm. For further details of the ultrasound transmitters 1 and 2, see FIG. 4 and the corresponding part of the description.

The infrared receiver 5 has the function of transmitting an electrical signal for each infrared signal received. This electrical signal is used to stop the corresponding counter 20 or 21 and to determine which items of information are transmitted from the mouse M and hence which of the keys $T_1$ and $T_3$ is depressed.

Infrared receivers of this kind are currently manufactured in integrated form for entertainment electronics. They are suitable for data transmission and substantially insensitive to disturbances. Even better results are obtained by using a maximum detector (similar to that used for the detection in the mouse M of an electrical signal corresponding to an ultrasound pulse I) for the reception of the infrared signal.

The digital logical part 19 serves mainly for decoding, i.e., for serial/parallel conversion of the received infrared data and their transmission to the calculator 4. The calculator 4 serves, inter alia, to conduct the trigger pulses for the ultrasound transmitters 1, 2 to the pulse transmitters 17 and 18 and to start the counters 20, 21. In addition, the calculator 4 supplies the pulse repetition frequency, i.e., the frequency with which the individual sound pulses are transmitted. The two counters 20 and 21 preferably count with a frequency of 10 MHz and therefore enable time to be measured to an accuracy of 0.1 microseconds.

Figure 3:
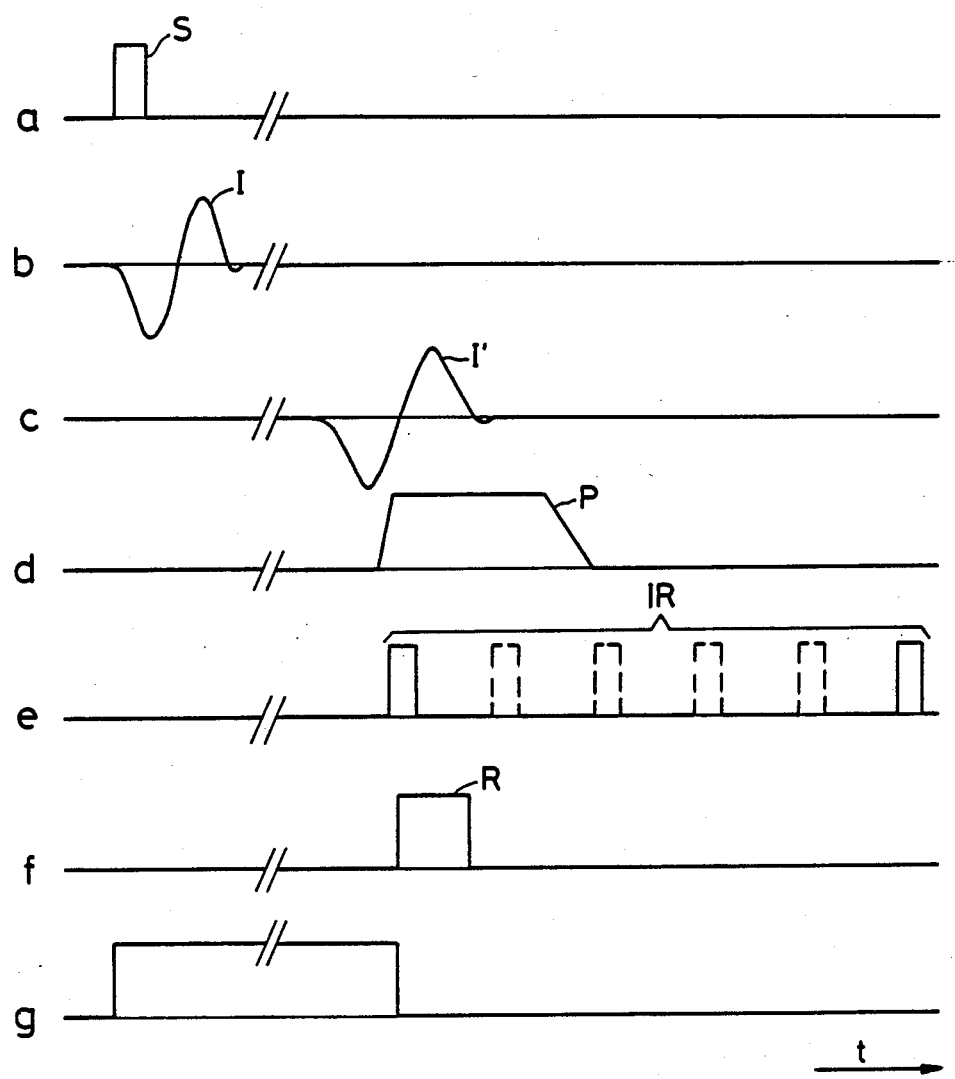
FIG. 3 is a set of time graphs explaining the mode of operation.

The measurement of sound travelling time from the ultrasound receivers 1, 2 in the base station B to the mouse M is illustrated by a set of time graphs in FIG. 3 in which the time axis (abscissa), however, is not true to scale.

FIG. 3 shows in line a the trigger pulse S (FIG. 1) transmitted from the pulse transmitter 17 or 18 to the ultrasound transmitter 1 or 2 after receiving a starting command from the calculator 4. This trigger pulse is rectangular in form with an amplitude of 200 V and a length of 1.5 microseconds. The starting command of the calculator 4 at the same time starts the corresponding counter 20 or 21 (line g).

The trigger pulse S of the pulse transmitter 17 or 18 causes a sound pulse I in the form of a sine wave segment illustrated in line b to be transmitted from the ultrasound transmitter 1 or 2. The length of the sound pulse I is 6.5 microseconds. The sound pulse I triggers a corresponding electrical signal in the ultrasound receiver 6 of the mouse M and this electrical signal is transmitted to the maximum detector 9 after amplification in the pre-amplifier 8. The output signal of the pre-amplifier 8 is indicated by I' in line c.

The maximum detector 9 detects the first maximum of the signal I' with the aid of the positive voltage change in this signal immediately following the maximum. As shown in line d, this voltage change produces in the maximum detector 9 an approximately trapezoidal signal P with a steep ascending flank. According to line e, this steep ascending flank releases the starting bit of the infrared pulse sequence IR of the infrared transmitter 7. The individual pulses of the infrared pulse sequence IR have a length of 10 microseconds and the distance between their successive centers is 64 microseconds.

The infrared receiver 5 converts the received infrared pulse sequence IR into a TTL-signal R (line f) whose positive flank stops the counter 20 or 21 (line g).

Figure 4:
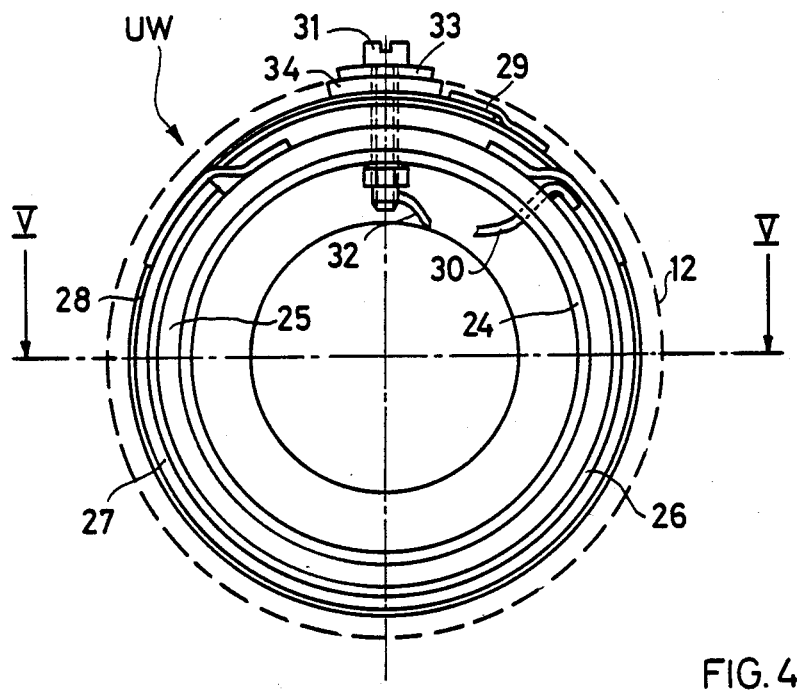
FIG. 4 is a top plan view of an ultrasound transducer.
Figure 5:
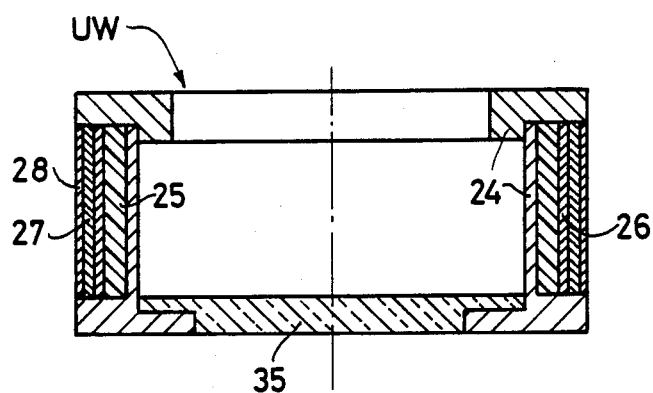
FIG. 5 is a section taken on the Line V—V of FIG. 4.

FIGS. 4 and 5 show an ultrasound transducer UW, which with slight modifications may be used either as ultrasound transmitter 1, 2 or as ultrasound receiver 6 (FIG. 2). FIG. 4 is a top plan view (with the upper part removed) and FIG. 5 is a view in section, both on a scale of about 2:1.

The ultrasound transducer is a cylindrical, so-called Sell transducer and basically it consists of a condenser with an air gap, one electrode of this condenser being fixed whereas the other electrode is movable. The cylindrical form on this transducer increases the accuracy of measurement of the travelling time of the ultrasound pulses and the measurement of travelling time is not dependent upon the direction.

The ultrasound transducer UW consists, as illustrated, of a support 24 composed of two annular parts made of a suitable material such as aluminum, for example, a plexiglass ring 25 which is mounted on the support 24 and to the external surface of which a metal foil 27 about 0.1 mm in thickness, for example, a copper foil, is applied by a layer of adhesive 26, and a plastics foil 28 which lies in contact with the outside of the metal foil 27 and is metal coated on its external surface. The foil 28 may be, for example, aluminum coated polypropylene foil having a thickness of 10 micrometers.

The copper foil 27 has a roughened surface to form an air gap of about 20 micrometers between the two electrodes 27 and 28. The plastics foil 28 is electretized so that it has an internal polarization whereby influence is produced both in the metal layer of the plastics foil 28 and in the copper foil 27, in other words, opposite charges are produced. The plastics foil 28 is thereby strongly attracted to the copper foil 27 so that it is fixed to the copper foil virtually unaided.

It may be seen from FIG. 4 that the copper foil 27 does not cover the whole circumference of 360 degrees of the plastics ring 25, but only about 260 degrees, and the effective range of the ultrasound transducer UW extends over about 210 degrees. The plastics foil 28 is long enough to enable the ends to overlap so that the overlapping end of the foil can be attached to the area of foil underneath it with an elastic adhesive tape 29.

The copper electrode 27 is soldered on its internal surface to a fine, fanned out lead 30 which passes through a bore in the plastics ring 25 into the inside of the ultrasound transducer UW. The movable electrode consisting of the plastic foil 28 is contacted by a screw 31 to which a lead 32 is soldered and which is electrically connected to the metal layer of the plastic foil 28 through a metal disc 33 and a graphite-treated plastic fabric 34. The outside of the ultrasound transducer UW is covered by a protective metal grid 12.

The ultrasound transducer UW illustrated in FIG. 5 is substantially similar to the embodiment of ultrasound receiver 6 (FIG. 2) and has a disc 35 of plexiglass at the bottom, fitted with crosswires 11 (FIG. 2). If a magnifying lens is used as additional positioning aid, then this is placed above the disc 35.

If the transducer UW is used as ultrasound transmitter 1, 2 (FIG. 1), it is fitted with an aluminum cover at the top and bottom and the support 24 is appropriately modified and so designed that the pulse transmitter 17, 18 (FIG. 2) can be built into the ultrasound transducer UW.

The functional block circuit diagram of the base station B of the mouse M in FIG. 2 is to be regarded as an exemplary embodiment and may, of course, be varied. Thus, for example, it is not necessary to provide two counters 20 and 21 when using the calculator 4, a single counter being sufficient. Furthermore, the time measurement may be carried out with a programmed counter timer on the calculator 4. The calculator 4 consists of a conventional personal computer which either carries out all the calculations itself or has a separate microprocessor associated with it for evaluating the sound travelling timespan and calculating the coordinates. Which of these solutions is to be preferred depends on the expense and on the flexibility and availability of connections to other systems.

The most essential parts of the described apparatus for determining position are the cylindrical ultrasound transducers which render the travelling time measurement independent of direction. The infrared transmitter 7 and infrared receiver 5 are also advantageous for the wireless indication of the point in time of reception of the ultrasound pulses.

The construction of the ultrasound transducers, in particular the use of the foil electret as movable electrode and the roughened, fixed electrode is also of major importance as it enables extremely brief sound pulses to be produced.

The ultrasound transmitter could, of course, be arranged in the mouse and the ultrasound receivers in the base station, in which case two such receivers would be required. The infrared transmitter and infrared receiver would also be interchanged. Furthermore, the infrared transmitter could be arranged in the position of the ultrasound transmitter(s) and the infrared receivers could be arranged in the position of the ultrasound receiver(s). In that case, an infrared signal would be transmitted simultaneously with the ultrasound pulse and the travelling time could be calculated from the time differences in the reception of the ultrasound signal and the infrared signal.

As already mentioned in the introduction to the description, the apparatus according to the invention may be used both as wireless and as wired cursor. Whereas the embodiment described with reference to FIGS. 1 and 2 is wireless, FIG. 6 shows an embodiment with a wired cursor.

Figure 6:
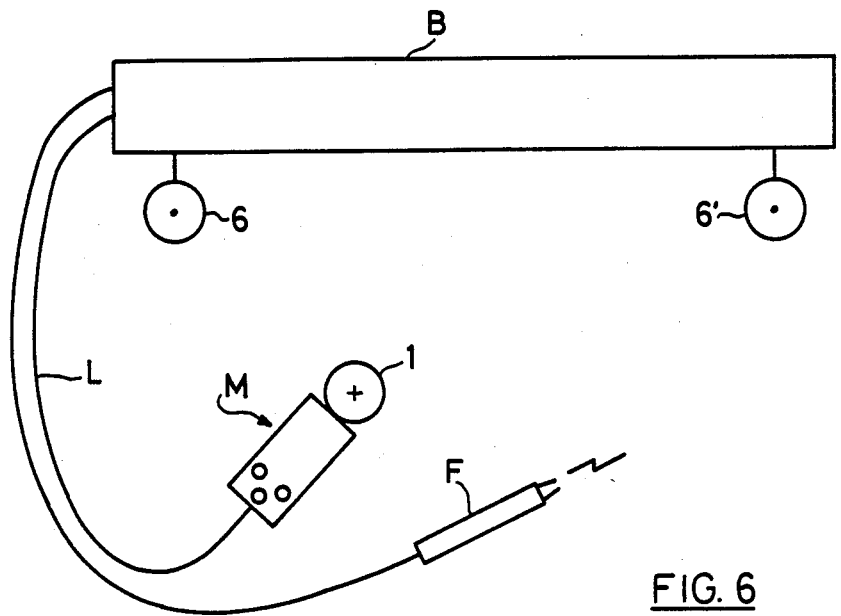
FIG. 6 is a sketch representing a variation of the apparatus of FIG. 1.

According to FIG. 6, two fixed ultrasound receivers 6, 6' are connected to the base station B and the cursor or mouse M contains a (movable) ultrasound transmitter 1. The cursor or mouse M is connected to the base station B through a lead L. This arrangement has the advantage that only one ultrasound transmitter is required. The two distances $d_1$ and $d_2$ (FIG. 1) are therefore measured simultaneously and the scanning frequency for a given working surface can be doubled.

For example, a scanning rate of 250 coordinates per second can be obtained for a working area of 1 $m^2$. Furthermore, a spark pen F may be connected to the base station B through a lead as illustrated instead of the cursor or mouse M. Suitable spark pens F are known from the literature, see for example, U.S. Pat. No. 3,838,212 and IEEE TRANSACTIONS ON COMPUTERS, Vol. C-19, No. 6, June 1970, pages 546–548. "A Sonic Pen: A Digital Stylus System" by A. E. Brenner and P. de Bruyne, which references are incorporated herein by reference.

If a mouse of the usual kind currently available is to be used in combination with a personal computer, then it is not possible to feed data of a graphic model into the computer, but instead a so-called digitizer indicator board must be used. This constitutes an additional unit of considerable size which is virtually impossible to integrate into the personal computer or the keyboard. If, however, the ultrasound transducer UW described above (FIGS. 4 and 5) is used, then no digitizer board is required and the ultrasound transmitter and the electronic control means can be integrated with the personal computer.

Figure 7:
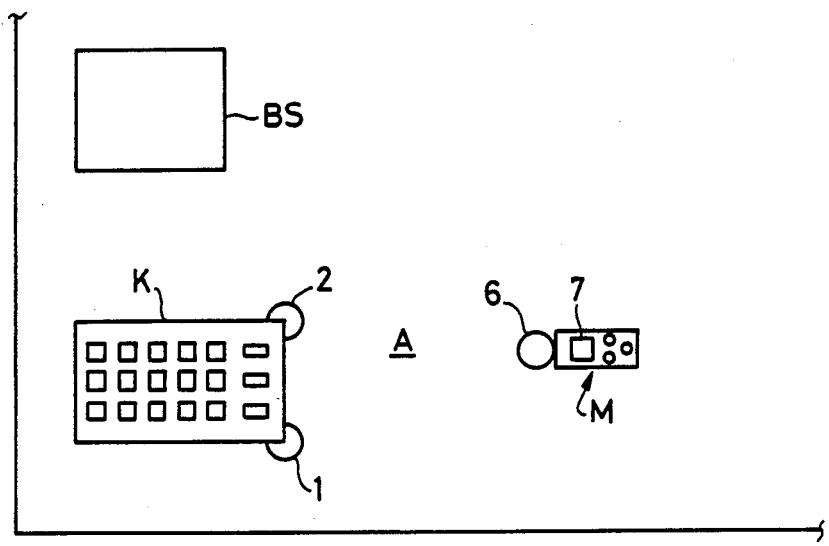
FIG. 7 is a diagrammatic sketch of a personal computer with an apparatus according to the invention.

Such an application of the described positioning device with a personal computer symbolized by a screen BS and keyboard K is shown diagrammatically in FIG. 7. The ultrasound transmitters 1 and 2 are combined with the base station B (FIG. 2) and form a basis for the keyboard K. The place on the Table A next to the keyboard K may be used as an indicator board on which the wireless mouse M or wireless cursor with ultrasound receiver 6 and infrared transmitter 7 can be moved without restriction. The cursor and the foundation under the keyboard K with the ultrasound transmitters 1 and 2 and the base station are quite small and in no way cause an obstruction when the working area of the cursor is required for other purposes. This convenience of use, which has hitherto distinguished mouse arrangements but not digitizers, is a very essential advantage of the apparatus according to the invention which may, after all, be used as digitizer.

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention.

What is claimed is:

1. Apparatus for determining the position of a movable object within a given boundary and relatively to fixed reference points by means of acoustic signals, comprising transmitter means and receiver means for ultrasound pulses and means for determining a travelling time of said ultrasound pulses between the movable object and the fixed reference points, characterized in that the transmitter and receiver means are formed by a cylindrical surface of an ultrasound transducer.

2. Apparatus according to claim 1, characterized in that means for the transmission of pulses in the region of visible or infrared light for the purpose of wireless indication of the point in time of the transmission or reception of the ultrasound pulses and means for the detection of these light pulses are provided.

3. Apparatus according to claim 2, characterized in that the cylindrical ultrasound transducers are Sell transducers which are covered on their surface with an electretized plastics foil which is metallized on one side and which forms the movable electrode of a condenser which has an air gap.

4. Apparatus according to claim 2, characterized in that the cylindrical ultrasound transducer is equipped on its surface with a metal foil or with a plastics foil metallized on its inner surface, the said metal or plastics foil forming the movable electrode of a condenser, whose fixed electrode is formed by PVDF foil electret which is metallized on its inner surface.

5. Apparatus according to claim 2, characterized in that at least two ultrasound transducers associated with the fixed reference points and acting as ultrasound transmitters and at least one ultrasound transducer associated with the movable object and acting as ultrasound receiver are provided.

6. Apparatus according to claim 5, characterized in that the function of the ultrasound transmitter and the function of the ultrasound receiver are interchanged.

7. Apparatus according to claim 3, characterized in that the fixed electrode of the ultrasound transducer is formed by a metal foil stretched over a support, in which foil the surface facing the metallized plastics foil has a roughened structure for the purpose of forming the air gap between the two electrodes.

8. Apparatus according to claim 5, characterized in that each ultrasound transmitter has an electric pulse transmitter associated therewith, and in that the electric pulse transmitter is structurally integrated with the corresponding ultrasound transmitter.

9. Apparatus according to claim 5, characterized in that the desired sound pulse has approximately the form of a 0°–360° segment of a sine wave.

10. Apparatus for determining the position of a movable object within a given boundary and relatively to fixed reference points by means of acoustic signals, comprising transmitter means and receiver means for ultrasound pulses and means for determining a travelling time of said ultrasonic pulses between the movable object and the fixed reference points, wherein the transmitter means and the receiver means are formed by cylindrical ultrasound transducers, wherein at least two ultrasound transducers associated with the fixed reference points and acting as ultrasound transmitters and at least one ultrasound transducer associated with the movable object and acting as an ultrasonic receiver are provided, wherein the desired sound pulse has approximately the form of a 0°–360° segment of a sine wave, wherein the ultrasound transmitter is a component of a fixed base station, wherein the ultrasound receiver is arranged on the movable object, and wherein the movable object in addition has an infrared transmitter for producing a signal indicating the point in time of the reception of an ultrasound pulse and the base station has an infrared receiver and a calculator.

11. Apparatus according to claim 10, characterized in that the calculator is designed to determine the rectangular coordinates of the movable object in relation to the fixed reference points.

12. Apparatus according to claim 11, characterized in that the movable object has a maximum detector for detecting a point in time of a first maximum of a received ultrasound pulse and in that the signal of the infrared transmitter is transmitted on the basis of the detection signal of the maximum detector.

13. Apparatus according to claim 12, characterized in that the base station has counters associated with the ultrasound transmitters, each of which counters is activated by the starting signal on the electric pulse transmitter and is stopped by a signal from the infrared transmitter received by the infrared receiver.

14. Apparatus according to claim 13, characterized in that the counters are components of the calculator.

15. Apparatus according to claim 10, characterized in that current supply for the movable object is provided by batteries.

16. Apparatus according to claim 11, characterized in that the movable object has a plurality of operating keys connected to the infrared transmitter, each of which operating keys is associated with a different code influencing the signal of the infrared transmitters.

17. Apparatus according to claim 10, characterized in that the movable object has a positioning aid for positioning the movable object at a desired point on a model field.

18. Apparatus according to claim 17, characterized in that the positioning aid is arranged on the ultrasound receiver, preferably in an opening or perforation at the center of the receiver providing visual access to the model field.

19. Apparatus according to claim 18, characterized in that the positioning aid is formed by a transparent window with crosswires inserted in the aforesaid opening or perforation.

20. Apparatus according to claim 15, characterized in that the movable object has a contact sensor (16) for the controlled switching on and off of the supply voltage in response to manipulations carried out by an operator after a pause, or not carried out within a certain period of time.

21. Apparatus according to claim 1, characterized in that the ultrasound transducers are transducers of the type having a ceramics coated membrane.

22. Apparatus according to claim 10 for use as a digitizer in combination with a calculator having a keyboard connected through a flexible lead, in particular a personal computer, characterized in that the base station with its ultrasound transmitters is adjusted in its dimensions to the keyboard and designed as basis for this keyboard.

23. A mouse system for generating planar coordinates of points on a surface over which a movable mouse may be moved, said system comprising a plurality of transducers for the conversion of electric pulses to sound wave pulses and for the conversion of sound wave pulses to electric pulses, at least two of said transducers being fixed in position relative to said surface at a predetermined distance apart and having generally cylindrical surface portions facing toward the area on said surface over which coordinates are to be determined, at least one of said transducers being attached to said mouse and having a generally cylindrical surface portion adapted to face toward said fixed transducers, driver-receiver means for causing the fixed or the mouse-carried transducers to emit ultrasound signals and the other to receive such signals, means for measuring the travel time of said ultrasound signals to provide measures of the distances between said mouse-carried transducer and each of said fixed transducers, and means for computing the coordinates of said mouse-carried transducer on the bases of such measures.

* * * * *